LINEAR PULSE STRETCHER

Filed Oct. 31, 1952 2 Sheets-Sheet 1

INVENTOR
MAURICE A. MEYER
BY Joseph Weingarten
ATTORNEY

Oct. 16, 1956 M. A. MEYER 2,767,311

LINEAR PULSE STRETCHER

Filed Oct. 31, 1952 2 Sheets-Sheet 2

INVENTOR
MAURICE A. MEYER

BY Joseph Weingarten
ATTORNEY

United States Patent Office 2,767,311

Patented Oct. 16, 1956

2,767,311

LINEAR PULSE STRETCHER

Maurice A. Meyer, Natick, Mass., assignor to Laboratory For Electronics, Inc., Boston, Mass., a corporation of Delaware Application October 31, 1952, Serial No. 317,873

6 Claims. (Cl. 250—27)

Figure 1:
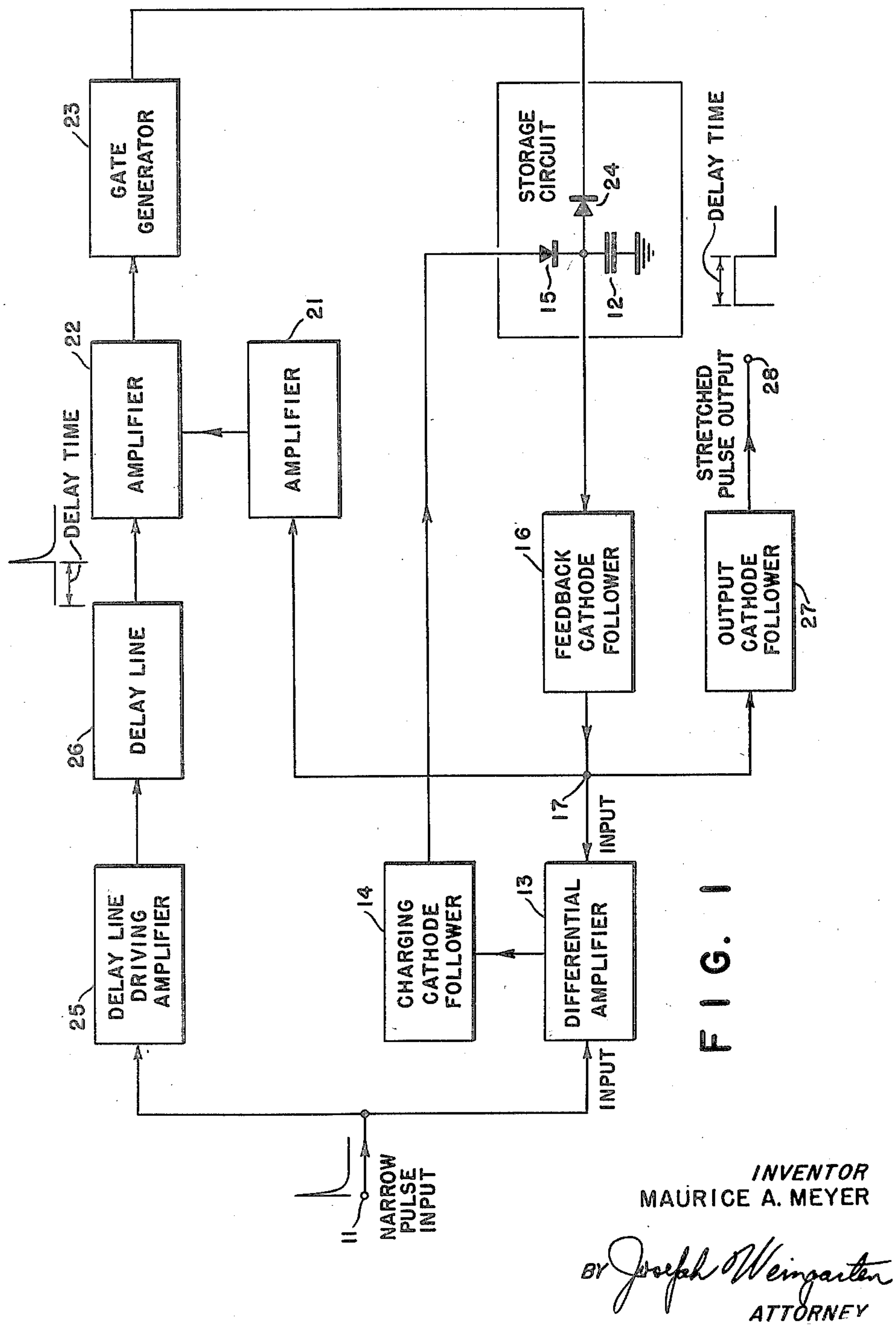

The present invention relates in general to electrical wave shaping circuits and more particularly to electronic apparatus capable of accepting signal pulses of comparatively short time duration and generating in response thereto, output pulses of substantially rectangular waveform of predetermined greater time duration and having equal or linearly related amplitudes. Circuits exhibiting these general characteristics are classified in the electronics art as "pulse stretchers."

Within this broad subject classification, there have been developed and described numerous circuits. An elementary circuit configuration includes a capacitor rapidly charged through associated electronic means and slowly discharged through a resistor or electron tube to attain the desired time delay. The conventional triggered multivibrator may be considered a pulse stretcher since for each narrow potential input pulse a substantially rectangular output wave of greater time duration may be derived. However, in practical application of these basic circuits difficulties are encountered in obtaining successive stretched pulses of precisely equal pulse widths irrespective of input signal wave shape. Moreover, there is ordinarily no exact and reproducible relationship between the amplitudes of the input signal and the output stretched pulses.

The problem of obtaining output pulses of precisely reproducible time duration has been approached through the use of delay lines as the key to circuit timing. Although circuits embodying delay lines are in fact capable of accurately fixing the time duration of the output pulse, it has been found difficult to obtain pulses which have sufficiently steep leading and trailing edges while the pulse potential during the delay period remains constant at an amplitude equal to or proportional to the peak amplitude of the input pulse. The latter requirement of linearity is of particular consequence where the amplitude of the input pulse is determinative of the functioning of the system. As an example, in certain radar applications, the amplitude of the input pulse may quantitatively represent relative range or elevation, and where the system requires the additional energy of a stretched pulse for proper operation it is essential that the exactness between the amplitudes of the applied pulses and output pulses be preserved even through the pulse stretching operation.

The present invention contemplates and has as a primary object the provision of a pulse stretching circuit capable of retaining to an exceptional degree such linear relationship despite extensive variations in range of pulse amplitude, width and waveform. In one embodiment of this invention, pulse stretching is accomplished by storing energy for a time equal to the delay period of a conventional delay line. However, as will become apparent, this basic concept is extended to obtain especially steep output pulse leading and trailing edges, while means are provided to prevent even minor variations in peak amplitude of the output pulse.

It is therefore another object of the present invention to provide a pulse stretching circuit capable of generating a precisely rectangular output waveform.

A further object of this invention is to provide a delay line type pulse stretcher incorporating novel feedback means for linearizing the relationship between the amplitudes of the input and stored signal energies.

Figure 2:
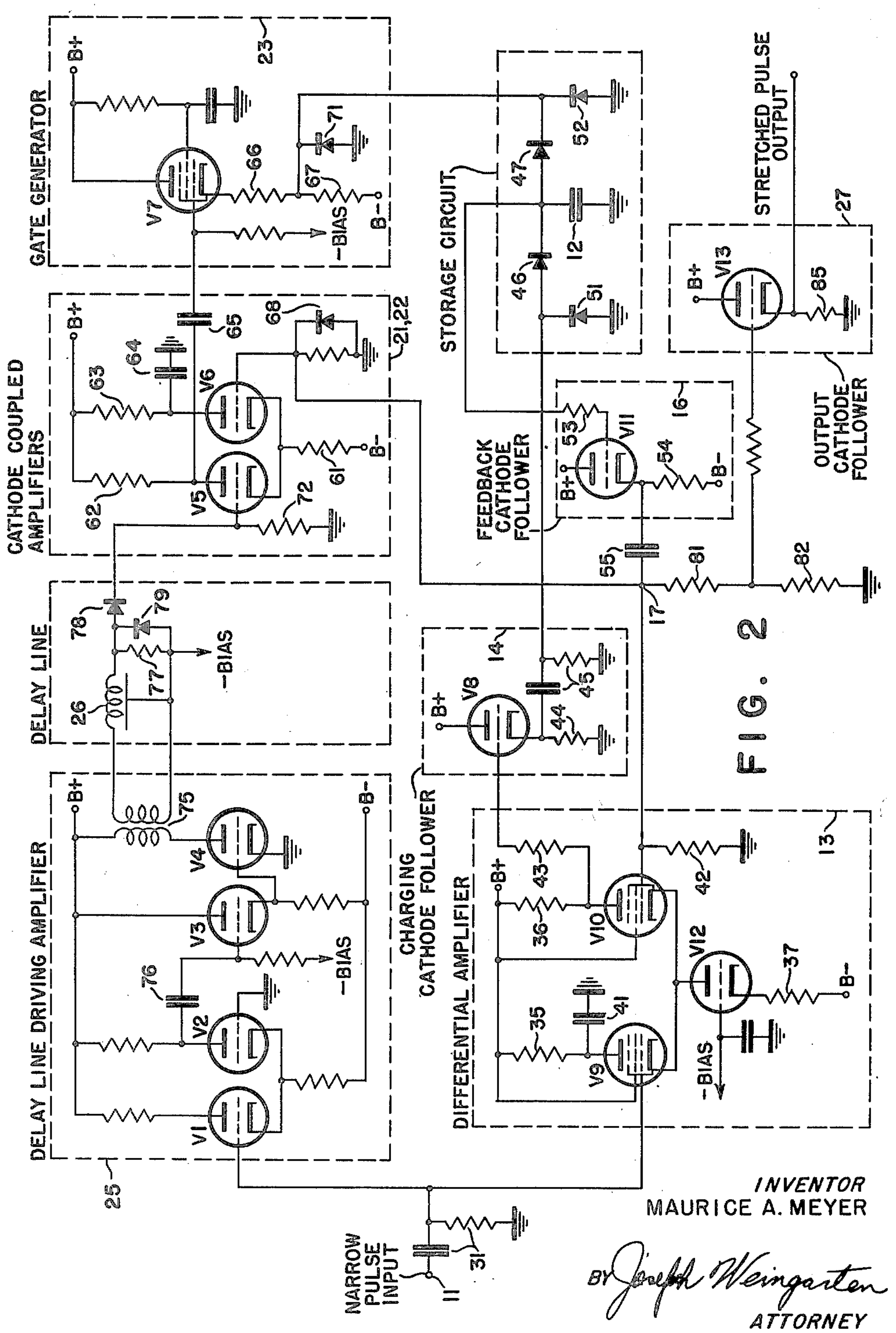

These and other objects and advantages of the present invention will best be understood from the following detailed specification when read in connection with the accompanying drawing in which:

Fig. 1 is a generalized block diagram illustrating the combination of circuits, functionally identified, comprising an embodiment of a linear pulse stretcher; and Fig. 2 is a schematic circuit diagram of the pulse stretcher illustrated in block form in Fig. 1.

With reference now to the drawing and more particularly to Fig. 1 thereof, the principles of operation will be discussed first without reference to the specific design of the circuits used to perform the functions set forth.

The input signal is applied at terminal 11 and ordinarily comprises an extremely sharp pulse or potential "spike" the total time duration of which may well be a small fraction of a microsecond. However, the general characteristics of the input pulse may vary considerably and aside from peak amplitude variations from pulse to pulse, the effective duration, energy content and waveform may all fluctuate as a function of time.

As illustrated, the input pulse is divided at terminal 11 and simultaneously applied to two substantially parallel branches converging upon an energy storage circuit which includes the capacitor 12. The first of these parallel systems may be termed a linear charging circuit and is formed of differential amplifier 13 driving charging cathode follower 14, whose output is coupled to the storage element through rectifier 15. Feedback cathode follower 16 completes the charging loop, and serves to transfer the storage capacitor potential at substantially unity gain to terminal 17 for application to various other circuits while providing a high degree of isolation to preclude premature discharge thereof.

As is evident from the block diagram, differential amplifier 13 is simultaneously energized by and continuously compares the amplitudes of the potentials of the pulse applied at terminal 11 and the storage capacitor potential as transferred to terminal 17. The output comprising a current proportional to the difference between these signals is applied through charging cathode follower 14 to storage capacitor 12. The precise manner in which this novel feedback arrangement functions in the pulse stretcher will be discussed after the circuit details have been presented in connection with Fig. 2.

The storage capacitor potential as it appears at terminal 17 is coupled through amplifiers 21 and 22 to a potential gate generator 23 whose output is also applied to storage capacitor 12 through a rectifier 24, which it will be noted is poled oppositely of rectifier 15 with respect to capacitor 12. The function of gate generator 23 is to discharge the storage circuit at a predetermined time; however, the circuit connections just outlined permit the gate generator to perform the additional function of precluding discharge through rectifier 24 at any other time while further being an element within a regenerative circuit for speeding response and sharpening the waveforms in a highly desirable manner.

The second channel emanating from the input terminal 11 may be termed the delay circuit and comprises driving amplifier 25 for delay line 26 the output of which is in turn applied to amplifier 22. Delay line 26 is the timing element and is by appropriate design selected to provide a delay equal to the time duration desired of the output stretched pulse. The delay circuit controls gate generator 23 and by virtue of the signal polarities involved determines the discharge time of storage capacitor 12.

In operation upon the application of a sharp pulse at terminal 11 the sequence of events is generally as follows: The charging network acts instantaneously to bring the initially uncharged storage capacitor 12 to a potential equal to the peak value of the input pulse, while gate generator 23 actuated through amplifiers 21 and 22 develops a gate larger in magnitude than the potential to which capacitor 12 is charged. This is of particular importance since rectifier 24 then effectively blocks discharge of capacitor 12 through the gate circuit. The charge on capacitor 12, and the potential gate, are uniformly maintained until the initial impulse fully traverses delay line 26, whereupon a discharge gate is generated, which when aided by the regenerative loop formed of cathode follower 16 and amplifiers 21 and 22, swiftly discharges capacitor 12 to its uncharged, quiescent state. The rise and fall of capacitor potential is taken at terminal 17 through an isolating cathode follower 27 to provide the system output stretched pulse at terminal 28. This signal appears as a pulse having a fixed potential or "flat-top" of a time duration equal exactly to the delay time of delay line 26.

With the general organization of the system in view, reference is now made to Fig. 2 for a discussion of the details of a circuit successfully employed in a specific pulse stretcher application. For assistance in determining the relationships among the elements of Figs. 1 and 2, the various circuits have been drawn in schematic form in Fig. 2 within blocks formed by broken lines correspondingly functionally to and bearing the same reference numerals as the blocks shown in Fig. 1.

The input pulse to be stretched is applied at terminal 11 and through a conventional resistance-capacitance network 31 is coupled simultaneously to the input of delay line driving amplifier 25 and to one input of differential amplifier 13. Following the pattern set in the discussion of Fig. 1, the linear charging circuit will be considered first.

It will be recalled that this circuit comprises differential amplifier 13, charging cathode follower 14, the storage circuit which includes storage capacitor 12, and feedback cathode follower 16. With particular reference to block 13, the differential amplifier is comprised of a pair of pentode electron tubes V9 and V10, the plates of which are energized from a positive potential source B+ through load resistors 35 and 36 respectively. The cathodes of these tubes are connected in parallel and are returned to a negative power source B— through the circuit of a suitably biased triode V12. The unbypassed cathode resistor 37 of triode V12 results in substantial negative feedback, effectively limiting the current therethrough to a constant value. Pentodes V9 and V10 share this constant current at all times. By suitable selection of the value of resistor 37 and the bias applied to the control grid of triode V12, a positive potential is obtained at the triode plate which establishes the bias level for the pentodes V9 and V10.

The screen grids of pentodes V9 and V10 are shown connected to B+; however, for achieving the desired degree of linearity, it may be desirable to "boot strap" these to the respective cathodes. Since the boot-strap principle is sufficiently well known, circuit details have been omitted for the purpose of simplifying the differential amplifier schematic diagram. The output of pentode V9 is not directly used and accordingly its plate is shown shunted to ground through capacitor 41.

The signal inputs to the differential amplifier are applied directly to the control grids of the pentodes. Thus, the input pulse as received at terminal 11 is coupled to the control grid of pentode V9, while the control grid of pentode V10 is energized from the feedback cathode follower 16. The output of the differential amplifier is taken from the plate of pentode V10 and coupled through resistor 43 to the control grid of triode V8 which comprises the charging cathode follower. No coupling capacitor is required here, since the steady state potential at the plate of pentode V10 may readily be established at slightly less than the positive potential appearing at the cathode of tube V8. In the conventional fashion, triode V8 is connected between the positive source B+ and ground and the signal output is taken across cathode load resistor 44 and applied to the input of the storage circuit through coupling circuit 45.

As shown in Fig. 2, the storage circuit comprises an array of rectifier elements 46, 47, 51 and 52 in association with the storage capacitor 12. Storage capacitor 12 is energized from charging cathode follower through rectifier 46 which is poled for the transmission of positive charging pulses. Rectifiers 51 and 52 will remain unaffected during a positive charging cycle due to the polarity arrangement thereof.

The potential of the storage capacitor 12 is directly and continuously applied through coupling resistor 53 to the control grid of triode V11 comprising the feedback cathode follower. The output of cathode follower V11 is derived from load resistor 54 and applied through capacitor 55 to terminal 17 to which the control grid of pentode V10 is coupled thereby completing the charging and feedback loop.

The operation of this loop may now be considered since, to a certain extent, it functions independently of the remainder of the circuit during the charging period. As hereinabove noted, the differential amplifier continuously compares and provides an output proportional to the difference between the magnitude of the input pulse and the magnitude of the potential stored upon capacitor 12. Initially this capacitor is uncharged so that the input potential to pentode V10 across grid resistor 42 is substantially zero. Upon the application of a positive pulse to terminal 11, the current in pentode V9 will be increased and because constant current has been established by triode V12, the current through pentode V10 will decrease by a corresponding amount. Resultantly, a positive pulse will be taken from the plate of pentode V10 and applied through charging cathode follower V9 and rectifier 46 to storage capacitor V12. As the potential of capacitor 12 increases, the feedback circuit, including cathode follower V11, correspondingly raises the potential applied to the control grid of pentode V10. In effect then, an increase in potential at the grid of tube V9 causes the simultaneous application of a potential to the control grid of tube V10 which tends to resist the development of a positive output at the plate of the latter tube. It may be demonstrated that through the use of this negative feedback charging arrangement, capacitor 12 will charge to a potential which substantially equals the peak amplitude of the pulse applied at input terminal 11. Experimental data indicate an equality of capacitor potential and pulse amplitude over extended ranges of input pulse amplitudes and widths.

Cathode coupled triodes V5 and V6 correspond respectively to the amplifiers 22 and 21 of Fig. 1. The parallel connected cathodes are returned to the negative power source B— through resistor 61. The plate of tube V5 is energized from B+ through resistor 62, and the plate of tube V6 through resistor 63. Capacitor 64 which shunts the plate of tube V6 to ground is relatively large, and hence this tube functions substantially as a cathode follower.

The storage capacitor potential as repeated at terminal 17 is applied to the control grid of triode V6 and through the mutually coupled cathodes, to the input of triode V5. Rectifier 68 precludes negative overshoots at this point.

The output of triode V5 is applied through coupling capacitor 65 to the control grid of cathode follower-pentode V7 in the gate generator 23. The cathode of this tube is returned to the negative potential source B— through the series cathode load resistors 66 and 67. The junction of these resistors is connected to ground through rectifier 71, the polarity of which is arranged so that this junction point may not become negative. It will be noted that rectifiers 71 and 52 are in fact in parallel. The use of more than one rectifier in this manner insures a low impedance path to ground during conduction thereof.

When capacitor 12 is charged, its potential as available at terminal 17 is applied to the control grid of triode V6 with the result that the cathodes of tubes V5 and V6 are driven more positive. Since the control grid of V5 is grounded through resistor 72, a positive signal is developed at the plate of tube V5 which is then coupled to the control grid of gate generator V7. Through conventional cathode follower action, the voltage at the junction of resistor 66 and 67 will likewise increase, and this potential is applied to the negative end of rectifier 47 in the storage circuit. Whatever the magnitude of the positive potential appearing at terminal 17, the positive potential developed at the junction of resistors 66 and 67 will be greater due to amplification introduced by triode V5. In other words, the positive potential applied to the negative end of rectifier 47 will be greater than the positive signal simultaneously appearing on storage capacitor 12, whereby rectifier 47 will isolate storage capacitor 12 from the gate generator circuit. Rectifiers 46, 51, 52 and 71 will have no effect during this interval because their polarity with respect to the positive gate is the same as that of rectifier 47.

Thus, when storage capacitor 12 is charged to a potential equal to the peak potential of the input pulse at terminal 11, the gate generator will preclude discharge in that direction while rectifier 46 will not permit discharge in the opposite direction. The potential of the storage capacitor thus remains invariant during the pulse stretching interval.

Referring now to the second channel energized by the input positive pulse, the delay line driving amplifier is formed of four tubes; namely, V1, V2, V3 and V4. Tube V1 is connected as a conventional triode amplifier between positive and negative power sources. Tube V2 is a cathode-coupled amplifier-limiter designed to compress the dynamic range of signals applied thereto. Signal compression prevents the loss of small pulse signals following a large signal, as might otherwise occur due to the time required for "recovery" of the pulse transformer 75. The output of limiter tube V2 is coupled through capacitor 76 to the control grid of triode V3 which functions as an isolating cathode follower, whose output is in turn applied directly to the control grid of triode V4 to drive the transformer 75. The secondary of transformer 75 couples the amplified pulse to delay line 26, the delay length utilized being determined by the desired stretched pulse duration. Resistor 77 terminates delay line 26 in its characteristic impedance and the delay line output is coupled through rectifier 78 to the control grid of triode amplifier V5. Rectifier 79 will short circuit any spurious negative signals at the delay line output.

As illustrated, a fixed bias voltage is applied to the delay line. In practice this voltage, which is of the order of one volt, prevents spurious positive pulses as, for example, those generated by transient responses in pulse transformer 75 and delay line 26 immediately subsequent to the application of a large signal thereto, reaching the control grid of triode V5. Should such spurious signals pass through the system, premature discharge of capacitor 12 might possibly result.

In tracing the polarities involved, a positive pulse at terminal 11 will result in the application of a positive pulse to the delay line in series with the small negative bias potential. Rectifier 78 will couple positive output pulses larger than the bias potential to the control grid of triode V5. The arrival of a positive signal at the control grid of triode V5 results in the generation of a negative signal at its plate which correspondingly reduces the potential at the junction of resistors 66 and 67. Clamping rectifiers 71 and 52 limit the fall at this point to ground potential.

The sharp reduction in potential discharges storage capacitor 12 through rectifier 47. Feedback cathode follower V11 couples the capacitor potential drop through triodes V6 and V5 to accelerate regeneratively the capacitor discharge, and a highly desirable rectangular waveform output pulse is thereby obtained.

At the termination of the input pulse at terminal 11, the control grid of tube V10 will remain positive through the action of cathode follower V11 and due to the fact that the time constant of the coupling circuit formed of capacitor 55 and resistor 42 is large relative to the pulse duration. With the grid of tube V10 positive, a negative drop proportional to the drop in the input pulse is transferred to the storage circuit, but is of no consequence since it is shorted by rectifier 51 and blocked by rectifier 46. At the time that the delayed pulse arrives to discharge capacitor 12, the negative potential drop at terminal 17, equal to the amplitude of the voltage which was stored on capacitor 12, is transferred through cathode follower V8 and restores the junction of rectifiers 51 and 46 to ground potential, without effect on storage circuit operation.

The signal output of feedback cathode follower V11 is applied to a voltage divider formed of resistors 81 and 82 and the signal appearing at the junction thereof is coupled to the output cathode follower, triode V13. The stretched output pulse is taken from cathode load resistor 85 at terminal 28. Although resistors 81 and 82 reduce the magnitude of the output pulse, the overall linearity of the circuit remains unaffected. Thus the output pulse taken from triode V13 is proportionately related to the amplitude of the input pulse applied at terminal 11.

Reviewing the operation of the circuit shown in Fig. 2, the linear charging circuit places upon a storage element a charge proportional to the peak amplitude of the input pulse. This potential is retained through the action of the gate generator during the delay period. Thereafter, under the influence of a circuit of predetermined time delay, the storage element is rapidly and regeneratively discharged by the gate generator. Overall circuit linearity is substantially independent of input pulse waveform or energy content. Under test, a circuit incorporating the design principles disclosed in Fig. 2 was found capable of providing a linear relationship between the input voltage spike and stretched pulse better than one db over a forty db range of input signals. An adjustable delay line may be used so that the time width of the output pulse may be selected to suit the particular application without adversely affecting circuit linearity. Further, although reference has been repeatedly made to capacitor storage, other available means for retaining energy electrically may be substituted therefor.

Modifications of the circuit illustrated in the light of the foregoing disclosure may, accordingly, now become obvious to those skilled in this art. It will be understood, therefore, that the scope of the present invention is to be regarded as subject only to those limitations of the appended claims.

What is claimed is:

1. An electrical pulse stretcher operative in response to an input pulse to provide an output pulse of proportional magnitude and of predetermined greater time duration comprising, in combination, a storage capacitor, a differential amplifier for continuously comparing the potential of said input pulse and the potential of said storage capacitor and providing an output current proportional to the difference therebetween, a first unilateral element, means for charging said capacitor with said differential amplifier output current through said first unilateral element, means for amplifying the potential appearing on said storage capacitor to develop a potential gate of like polarity and greater magnitude, a second unilateral element connected to said storage capacitor and poled with respect thereto oppositely of said first unilateral element, means for applying said potential gate to said second unilateral element thereby precluding discharge of said capacitor therethrough during the time interval of said gate, a delay line, means for applying said input pulse to said delay line, the output of said delay line being coupled through said amplifying means to control said gate potential and arranged whereby the pulse output of said delay line diminishes said potential gate magnitude to discharge said capacitor through said second unilateral element, the discharge of said capacitor being regeneratively aided by the aforesaid means for amplifying the potential appearing thereon.

2. Apparatus as in claim 1 and including means for biasing said delay line to inhibit the discharge of said capacitor by pulses other than said delayed input pulse.

3. Apparatus as in claim 1 wherein said means for applying said input pulse to said delay line includes means for compressing the dynamic range of said input pulse, whereby spurious discharge of said capacitor except in response to said delayed input pulse is inhibited.

4. Apparatus as in claim 1 wherein said potential gate is developed by a cathode follower whose cathode circuit output is coupled through said second unilateral element to said storage capacitor, and a third unilateral element clamping said cathode circuit output unilaterally to the discharged potential of said storage capacitor.

5. An electrical pulse stretcher operative in response to an input pulse to provide an output pulse of proportional magnitude and of predetermined greater time duration comprising, in combination, a storage capacitor, a differential amplifier for continuously comparing the potential of said input pulse and the potential of said storage capacitor and providing an output current proportional to the difference therebetween, means for charging said capacitor with said output current, means for amplifying the potential appearing on said storage capacitor to develop a potential gate of like polarity and greater magnitude, a unilateral element coupling said potential gate to said storage capacitor and poled to preclude charge flow to and from said capacitor during the interval of said greater magnitude gate, a delay circuit, means for applying said input pulse to said delay circuit, the output of said delay circuit being coupled through said amplifying means to control said gate potential and arranged whereby the pulse output of said delay circuit diminishes the potential gate magnitude to discharge said capacitor through said unilateral element, said means for amplifying the potential appearing on said storage capacitor being operative during the discharge of said capacitor for regeneratively speeding the discharge thereof.

6. An electrical pulse stretcher operative in response to an input pulse to provide an output pulse of proportional magnitude and of predetermined greater time duration comprising, in combination, a storage capacitor, a substantially linear charging circuit for charging said capacitor instantaneously in response to said input pulse, said charging circuit including a differential circuit for continuously comparing the potential of said input pulse and the potential of said capacitor and providing a capacitor charging current proportional to the difference therebetween, a delay circuit energized by said input pulse, and a potential gate generator having an output unilaterally coupled to said capacitor and an input coupled to said differential circuit, said gate generator being operative in response to an increase in the value of the potential of said storage capacitor for generating a potential gate of like polarity and greater magnitude and in response to the output of said delay circuit for generating a potential gate of opposite polarity for discharging said storage capacitor, said coupling between said gate generator and said differential circuit being operative during discharge of said storage capacitor for regeneratively speeding the discharge thereof, said unilateral coupling being arranged to preclude charge flow to and from said capacitor during the interval of said greater magnitude gate.

References Cited in the file of this patent

UNITED STATES PATENTS

| | | |
|---|---|---|
| 2,419,340 | Easton | Apr. 22, 1947 |
| 2,457,140 | Frankel | Dec. 28, 1948 |
| 2,472,209 | Hall | June 7, 1949 |
| 2,496,337 | De Boisblanc | Feb. 7, 1950 |
| 2,543,445 | Doolittle | Feb. 27, 1951 |
| 2,567,247 | Spaulding | Sept. 11, 1951 |
| 2,572,080 | Wallace | Oct. 23, 1951 |
| 2,616,047 | Boothroyd | Oct. 28, 1952 |
| 2,688,697 | Lawson et al. | Sept. 7, 1954 |
| 2,697,782 | Lawson | Dec. 21, 1954 |
| 2,700,732 | Holdam et al. | Jan. 25, 1955 |